United States Patent [19]

Lohner

[11] 4,364,733

[45] Dec. 21, 1982

[54] TRIMMER FOR MOTORBOATS

[75] Inventor: Ludwig Lohner, Gilching, Fed. Rep. of Germany

[73] Assignee: Bayerische Motoren Werke A.G., Munich, Fed. Rep. of Germany

[21] Appl. No.: 169,136

[22] Filed: Jul. 15, 1980

[30] Foreign Application Priority Data

Jul. 20, 1979 [DE] Fed. Rep. of Germany ....... 2929420

[51] Int. Cl.³ .............................................. B63H 5/12
[52] U.S. Cl. ...................................... 440/2; 338/199; 440/57
[58] Field of Search ................... 440/57, 2, 6, 58, 59; 114/144 E; 338/163, 184, 199, 196, 197, 315

[56] References Cited

U.S. PATENT DOCUMENTS

| | | | |
|---|---|---|---|
| 3,641,965 | 2/1972 | Schmiedel | 440/2 |
| 3,834,345 | 9/1974 | Hager et al. | 440/57 |
| 3,954,081 | 5/1976 | Blake | 440/6 |
| 4,231,310 | 11/1980 | Muramatsu | 114/144 E |

*Primary Examiner*—Sherman D. Basinger
*Attorney, Agent, or Firm*—Paul M. Craig, Jr.

[57] ABSTRACT

A trimmer for a motorboat with a drive mechanism mounted to be rotatably movable in a gimbal ring by way of horizontal pins is disclosed. The trimmer comprises a revolving part and a fixed part arranged within a horizontal pin. The fixed part is connected for rotation with the pin and the revolving part is connected for rotation with the gimbal ring.

8 Claims, 4 Drawing Figures

TRIMMER FOR MOTORBOATS

BACKGROUND AND SUMMARY OF THE INVENTION

The present invention relates to a trimmer for motorboats with a drive mechanism rotatably movably mounted in a gimbal ring by way of horizontal pins, with a revolving part and with a fixed part, of which one part is connected to a pin and the other part is connected to the gimbal ring for rotation therewith.

U.S. Pat. No. 3,834,345 and U.S. Pat. No. 3,641,965 disclose such trimmers, constructed as a rotatable Hall cell and as a rotary potentiometer, respectively, which are attached externally to the gimbal ring, and the revolving part of which is connected to one of the pins for rotation therewith.

This known arrangement of the trimmer requires, in the range of mobility of the gimbal ring rotatable about a vertical axis, special recesses for the trimmer in the protective bubble surrounding the gimbal ring. Due to the externally projecting mounting of the trimmer, there exists, in addition to this additionally occupied amount of space, the danger of damage to the trimmer, especially in case of an extreme rotational position of the gimbal ring where the trimmer in such a case, projects out of the protective bubble.

The present invention is based on the object of arranging a trimmer of the type mentioned in the foregoing so that it is protected from damage and occupies only a small amount of space.

The invention attains this object by providing that the revolving part is connected to the gimbal ring for rotation therewith and is arranged, together with the fixed part within the pin.

By the kinematic reversal of the operation of the trimmer and its arrangement entirely within the pin, no separate structural volume is required for the trimmer. Since the trimmer does not project from the gimbal ring, the danger of damage is eliminated.

According to one embodiment of the present invention the revolving part and the fixed part of the trimmer are arranged in a bore of the pin. This arrangement requires only a small cost in construction, since the bore can be produced in one working step together with the machining of the pin.

For the axial fixation of the trimmer within the bore, a collar, easy to manufacture can be provided, the trimmer being in contact with this collar, and the revolving part penetrating through this collar.

The revolving part can be turned in a constructionally particularly simple way by means of a sleeve attached to the gimbal ring, which sleeve accommodates the revolving part within for rotation therewith and is integral with a plate attached to the gimbal ring. If the plate is arranged to be countersunk and planar with its surface with regard to the gimbal ring, then the trimmer requires no additional space whatever. In contrast thereto, a construction of the trimmer can be produced at lower cost wherein the plate rests on the gimbal ring.

An adjustment of the trimmer is made possible in a constructionally simple way by making the plate adjustable in its rotational position. For this purpose, the plate can be provided, for example, with slotted holes arranged uniformly over the circumference thereof and having the shape of a circular arc section, adjusting screws mounted in the gimbal ring engaging these slotted holes. To protect the trimmer from outside influences, such as seawater, for example, a seal can be arranged on the periphery of the sleeve and in the bore. This seal can be, for example, an O-ring which is held in an annular groove within the bore.

A stable position of the trimmer and additional protection from outside influences are attained in a simple way by casting the fixed part within the pin.

The trimmer, normally being of an electrical or magnetic structure, is connected via supply lines to an indicator instrument. A protected arrangement of these supply lines can be achieved with low structural expenditure by extending the supply lines toward the drive mechanism.

BRIEF DESCRIPTION OF THE DRAWINGS

These and other objects, features and advantages of the present invention will become more apparent from the following description when taken in connection with the accompanying drawings, which show, for purposes of illustration only, one embodiment in accordance with the present invention.

DETAILED DESCRIPTION OF THE DRAWINGS

Figure 1:
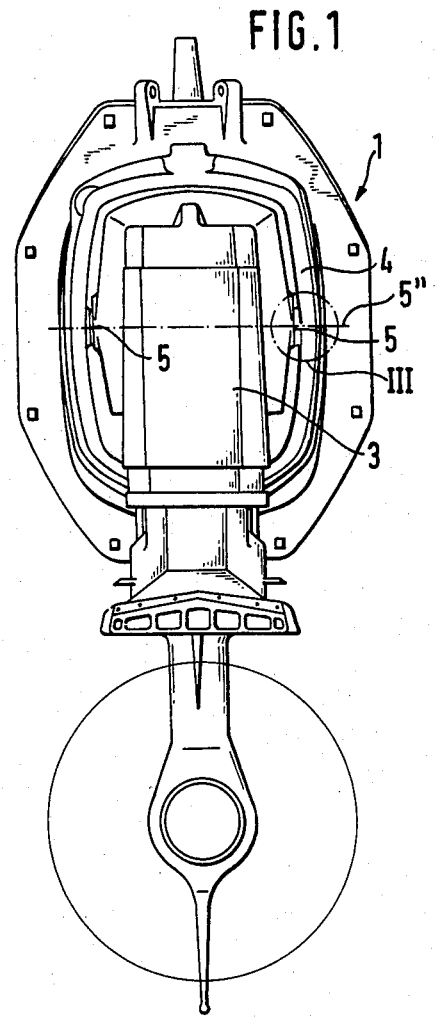
FIG. 1 shows a drive mechanism for a motorboat adjustable in its trimming position, seen from the rear of the boat.
Figure 2:
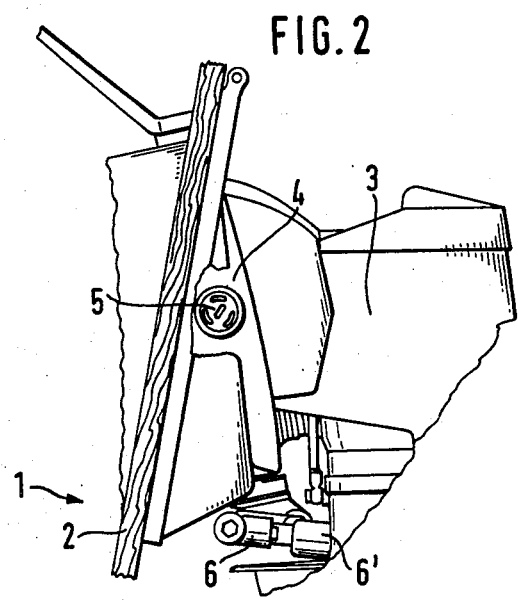
FIG. 2 shows the drive mechanism of FIG. 1 from the side.

A motorboat 1, shown in part in FIGS. 1 and 2 has on its rear wall 2 a drive mechanism 3 held in a gimbal ring 4 and the trimming position of which, i.e. its inclination relative to the motorboat 1, is adjustable. The gimbal ring 4 is rotatable about a vertical axis and contains two horizontal pins 5 rigidly connected to the drive mechanism 3 and rotatably movably arranged in a synthetic-resin bushing 5' within the gimbal ring. The gimbal ring 4 furthermore retains piston rods 6 of two hydraulically operated pistons at their ends, the cylinders 6' of these pistons being connected to the drive mechanism 3 and pivoting the latter by way of the pins 5 about a horizontal axis 5'', thus varying the trimming position of the drive mechanism 3.

Figure 3:
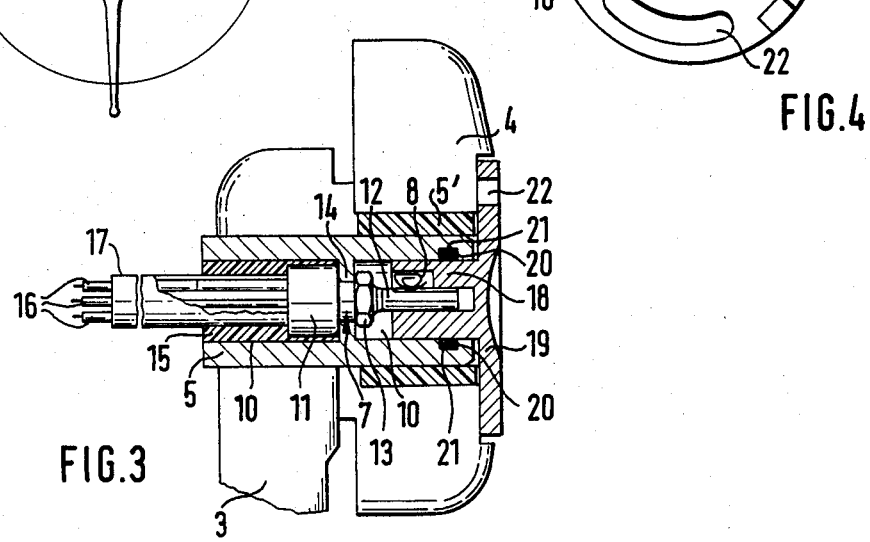
FIG. 3 shows a trimmer for the drive mechanism of FIGS. 1 and 2 in a sectional view.

One or both pins 5 contain, as shown in a sectional view in FIG. 3 as a fragmentary view III from FIG. 1, a trimmer fashioned as a rotary potentiometer 7 and not illustrated in detail.

The rotary potentiometer 7 is arranged in a compact and protected fashion in a bore 10 of the pin 5 and consists of a fixed part 11 and a revolving part 12. The fixed part 11 is attached by way of a nut 13, secured against twisting, to a collar 14 and is cast with a synthetic resin 15. By way of connecting lines 16 extending in a protective sleeve 17 to the drive mechanism 3, the potentiometer is connected to an indicator instrument, not shown.

Figure 4:
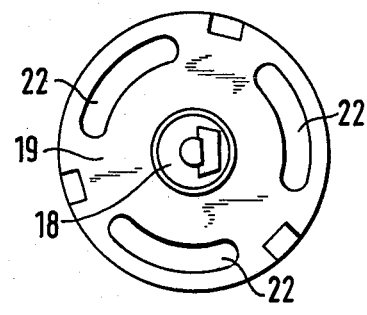
FIG. 4 shows an adjusting device for the trimmer of FIG. 3.

The revolving part 12 projects through the collar 14 and is held by means of a bracket 8 without play and fixed against rotation in a sleeve 18 which is integral with a thin plate 19 attached to the outside of the gimbal ring 4. On the periphery of the sleeve 18, a sealing means fashioned as an O-ring 20 is arranged and is held in an annular groove 21 of the bore 10 of pin 5. The plate 19, illustrated separately and from the inside in FIG. 4, is integrally joined to the sleeve 18, and serves for the adjustment of the rotary potentiometer 7. For this purpose, the plate is adjustable in its rotational position by slotted holes 22 extending in the peripheral direction thereof, one of these holes being shown in FIG. 3 from the side. Screws, not shown, are held in the gimbal ring 4, and extend through these slotted holes.

The sleeve 18, retains, when the drive mechanism 3 is being trimmed, the revolving part 12, whereas the fixed part 11 is rotated together with the pin 5 with respect to the revolving part 12. The change in resistance of the rotary potentiometer 7, resulting from this relative rotation of the revolving part 12 with respect to the fixed part 11, is a measure for the change in the trimming position of the drive mechanism 3 and is indicated on the indicating instrument.

While I have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. A trimmer for indicating the trimming position of a drive mechanism of a motorboat wherein the drive mechanism is mounted to be rotatably movable in a gimbal ring by way of horizontal pins, said trimmer comprising a revolving part and a fixed part, both said revolving part and said fixed part being arranged within one of said horizontal pins, said fixed part being connected for rotation with the pin and the revolving part being connected for rotation with the gimbal ring, whereby said trimmer is protected from damage and requires no separate structural volume.

2. The trimmer according to claim 1, wherein said revolving part and said fixed part are arranged in a bore of said pin.

3. The trimmer according to claim 2, wherein said fixed part rests on a collar formed within the bore of said pin, the revolving part passing through said collar.

4. The trimmer according to claim 1, 2, or 3, wherein a sleeve is provided for receiving the revolving part and for rotation therewith, said sleeve being integral with a plate attached to the gimbal ring.

5. The trimmer according to claim 4, wherein said plate is adjustable in its rotational position on said gimbal ring.

6. A trimmer according to claim 4, wherein sealing means is arranged on the periphery of said sleeve and in the bore of said pin.

7. A trimmer according to claim 1, wherein said fixed part is cast within the pin.

8. A trimmer according to claim 7, including supply lines which extend from said trimmer toward the drive mechanism.

* * * * *